US007944607B2

(12) United States Patent
Tournois

(10) Patent No.: US 7,944,607 B2
(45) Date of Patent: May 17, 2011

(54) METHOD AND DEVICE FOR HIGH RESOLUTION ACOUSTO-OPTIC PROGRAMMABLE FILTERING IN THE INFRARED REGION

(75) Inventor: Pierre Tournois, Cagnes S/Mer (FR)

(73) Assignee: Fastlite, Paris (FR)

( * ) Notice: Subject to any disclaimer, the term of this patent is extended or adjusted under 35 U.S.C. 154(b) by 0 days.

(21) Appl. No.: 12/237,354

(22) Filed: Sep. 24, 2008

(65) Prior Publication Data

US 2009/0080061 A1   Mar. 26, 2009

(30) Foreign Application Priority Data

Sep. 24, 2007   (FR) ..................... 07 06683

(51) Int. Cl.
G02F 1/33   (2006.01)
(52) U.S. Cl. .................. 359/308; 359/314; 359/305
(58) Field of Classification Search .............. 359/285, 359/287, 305, 308, 309, 313, 314
See application file for complete search history.

(56) References Cited

U.S. PATENT DOCUMENTS

| | | | | |
|---|---|---|---|---|
| 3,843,234 A * | 10/1974 | Dobrzhansky et al. | ....... | 359/305 |
| 3,944,335 A | 3/1976 | Saito et al. | | |
| 4,602,342 A * | 7/1986 | Gottlieb et al. | ................. | 702/31 |
| 4,639,092 A * | 1/1987 | Gottlieb et al. | ............... | 359/308 |
| 4,685,772 A * | 8/1987 | Chang | ........................... | 359/308 |
| 7,570,358 B2 * | 8/2009 | Den Boef | ..................... | 356/326 |

FOREIGN PATENT DOCUMENTS

| | | |
|---|---|---|
| EP | 0 180 449 | 5/1986 |
| WO | 2004109370 A2 | 12/2004 |
| WO | 2004109370 A3 | 12/2004 |

OTHER PUBLICATIONS

Preliminary Search Report dated Mar. 27, 2008, issued in French Patent Application No. FR 0706683.
Kaplan and Tournois, "Theory and performance of the acousto optic programmable dispersive filter used for femtosecond laser pulse shaping," J. Phys. IV France 12, pp. Pr5-69-PrPr5-75 (2002).
European Search Report, for European Patent Application EP 08 29 0844, dated Feb. 20, 2009.
V. Voloshinov et al., "Diffraction of light by ultrasound in acoustically anisotropic medium", Proceedings of the SPIE, vol. 3581, pp. 108-117 (1998).
V. Voloshinov et al., "Elastic anisotropy of acousto-optic interaction medium", Proceedings of the SPIE, vol. 4514, pp. 8-19, (2001).

* cited by examiner

Primary Examiner — David N Spector
(74) Attorney, Agent, or Firm — Browdy and Neimark, PLLC

(57) ABSTRACT

The subject matter of the invention is a method of high-resolution acousto-optic programmable filtering in the infrared region of an incident optical wave. To that end it proposes the use of a birefringent acousto-optic crystal whereof the propagation speed of acoustic waves is slow, such as compounds of mercury, which acousto-optic crystal comprises, on one of its faces, a piezoelectric transducer designed to generate a transverse acoustic wave with wave vector whereof the energy propagates according to the same axis but in the opposite direction to the energy of the incident optical wave, knowing that the optical wave resulting from the acousto-optic interaction between the incident optical wave and the acoustic wave with wave vector is diffracted perpendicularly or almost perpendicularly to the direction of the incident optical wave.

7 Claims, 6 Drawing Sheets

METHOD AND DEVICE FOR HIGH RESOLUTION ACOUSTO-OPTIC PROGRAMMABLE FILTERING IN THE INFRARED REGION

BACKGROUND OF THE INVENTION

1. Field of the Invention

The present invention relates to a method and a device for high-resolution acousto-optic programmable filtering in the infrared region.

This method applies in particular to acousto-optic programmable filtering for the mid-infrared region ranging from a wavelength $\lambda$ in vacuum of 5 to 20 µm.

2. Description of the Prior Art

The transparency window of $TeO_2$, which extends from 0.35 to 4.5 µm, does not allow development of an Acousto-Optic Programmable Filter (AOPDF) for the mid-infrared region ranging from 5 to 20 µm, such as that described in the article published in the journal J.Phys.France 12 (2002) Pr. 69/75: "Theory and Performance of the Acousto-Optic Programmable Dispersive Filter used for Femtosecond Laser Pulse Shaping".

Generally, it is known that the best materials for such an application are compounds of mercury such as $Hg_2Cl_2$, $Hg_2Br_2$ and $Hg_2I_2$. Amongst these materials, only calomel ($Hg_2Cl_2$) is today capable of industrial use.

In this wavelength range of 5 to 20 µm, calomel, which is a uniaxial birefringent crystal, is only slightly dispersive. Its ordinary index $n_0$ is close to 1.898 and its extraordinary index $n_e$ on the axis [110] is close to 2.445. The propagation speed of transverse acoustic waves is very slow on the axis [110] ($V_{110}$=347 m/s) and much faster on the axis [001] ($V_{001}$=1084 m/s).

OBJECT OF THE INVENTION

The subject matter of the invention is a method of high-resolution acousto-optic programmable filtering in the infrared region of an incident optical wave; to that end it proposes the use of a birefringent acousto-optic crystal whereof the propagation speed of acoustic waves is slow, such as compounds of mercury, which acousto-optic crystal comprises, on one of its faces, a piezoelectric transducer designed to generate a transverse acoustic wave whereof the energy propagates according to the same axis but in the opposite direction to the energy of the incident optical wave, knowing that the optical wave resulting from the acousto-optic interaction between said incident optical wave and said acoustic wave is diffracted perpendicularly or almost perpendicularly to the direction of said incident optical wave.

SUMMARY OF THE INVENTION

More precisely, the acousto-optic interaction used is such that the direction of the acoustic and ordinary optical beams, characterised by their energy directions defined by the Poynting vectors, is identical. The beams are collinear energy-wise in order to maximise the length of the acousto-optic interaction. Under these conditions, the effective acousto-optic coefficient p for calomel is given by:

$$p=-\tfrac{1}{2}(p_{11}-p_{12})\sin\theta_0\cos\theta_a+p_{44}\cos\theta_0\sin\theta_a \quad \text{(equation 1)}$$

where $p_{11}$=0.551, $p_{12}$=0.44, and $p_{44}$ is to be defined, and where $$\tan\theta_a=(V_{110}/V_{001})^2\tan\theta_0 \quad \text{(equation 2)}$$

and the figure of merit $M_2$, which characterises the diffraction efficiency, is given by:

$$M_2=n_0^3[n_d(\theta_d)]^3 p^2/\rho[V(\theta_a)]^3 \quad \text{(equation 3)}$$

In these equations, $\rho$ is the density of calomel equal to 7.19 g/cm³, $\theta_0$ is the angle made by the incident ordinary optical wave vector with the axis [110], $\theta_d$ the angle made by the diffracted extraordinary optical wave vector with the axis [110], and $\theta_a$ the angle made by the acoustic wave vector with the axis [110]. Furthermore, $n_d(\theta_d)$ and $V(\theta_a)$ are given by:

$$n_d(\theta_d)=n_0 \cdot n_e/[n_0^2\cos^2\theta_d+n_e^2\sin^2\theta_d]^{1/2} \quad \text{(equation 4)}$$

$$V(\theta_a)=[V^2_{110}\cos^2\theta_a+V^2_{001}\sin^2\theta_a]^{1/2} \quad \text{(equation 5)}$$

In the case of calomel, for optical wavelengths lying between 5 and 20 µm, the figure of merit $M_2$ passes through a maximum for $\theta_0$–52°, $\theta_a$=7.47° and $p_{44}$=0.

Thus, frequency or optical wavelength filters, with a high spectral resolution, can be constructed by acoustic diffraction of the incident ordinary optical beam according to a diffracted extraordinary optical beam.

BRIEF DESCRIPTION OF THE DRAWINGS

One embodiment of the method according to the invention will be described hereinafter, by way of a non-limiting example, with reference to the accompanying drawings in which.

DESCRIPTION OF THE PREFERRED EMBODIMENTS

Figure 1:
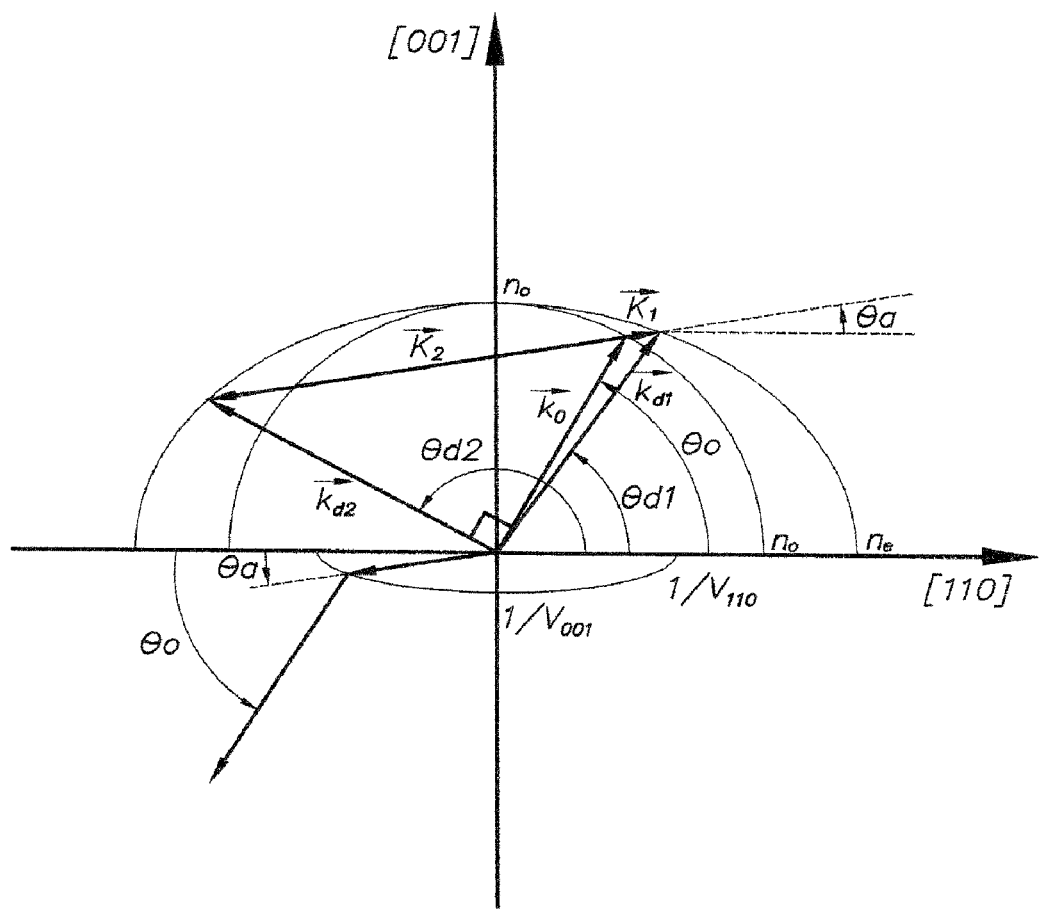
FIG. 1 is a schematic depiction of the optical and acoustic slowness curves defining the composition of the acoustic wave vectors according to two solutions referred to as "low frequency" (small $K_1$ vector) and "high frequency" (Large $K_2$ vector)

In the example depicted in FIG. 1, the schematic depiction of the optical slowness curves (upper dials) and the acoustic slowness curve (lower dials) shows, in the orthonormal system defined by the axes [110] and [001] of the birefringent crystal, that two solutions are possible which lead to acoustic wave vectors K=2πƒ/V($\theta_a$) of very different lengths and therefore very different acoustic frequencies ƒ.

In the visible and near infrared region, where the acousto-optic material of choice is $TeO_2$, only the short vector K can be used since the long vector corresponds to very high acoustic frequencies which are absorbed in the material.

In the mid-infrared region, where the material of choice may be calomel whereof the acoustic propagation speed is very slow, both solutions for the vector K can be used.

These solutions are as follows:

$$K_{1,2}/k_0 = \{\pm[\cos(\theta_0-\theta_a)+2\delta\sin\theta_0\sin\theta_a]+ (1+2\delta)^{1/2}[\cos^2(\theta_0-\theta_a)+2\delta\sin^2\theta_a]^{1/2}\}/[1+2\delta\sin^2\theta_a] \quad \text{(equation 6)}$$

Where:

$$k_0 = 2\pi n_0/\lambda,$$

$$2\delta = (n_e^2 - n_o^2)/n_o^2,$$

knowing that $2\delta$ is approximately equal to 0.6595 for calomel and wavelengths lying between 5 and 20 μm.

The acoustic frequencies are then given by:

$$f_{1,2} = [n_0 V(\theta_a)/\lambda]\{\pm[\cos(\theta_0-\theta_a)+2\delta\sin\theta_0\sin\theta_a]+ (1+2\delta)^{1/2}[\cos^2(\theta_0-\theta_a)+2\delta\sin^2\theta_a]^{1/2}\}/[1+2\delta\sin^2\theta_a] \quad \text{(equation 7)}$$

In view of the energy alignment equation (equation 2) and the value of the acoustic speeds and optical indices of calomel, the product of frequency and wave length ($f\lambda$) is solely a function of $\theta_0$.

Figure 2:
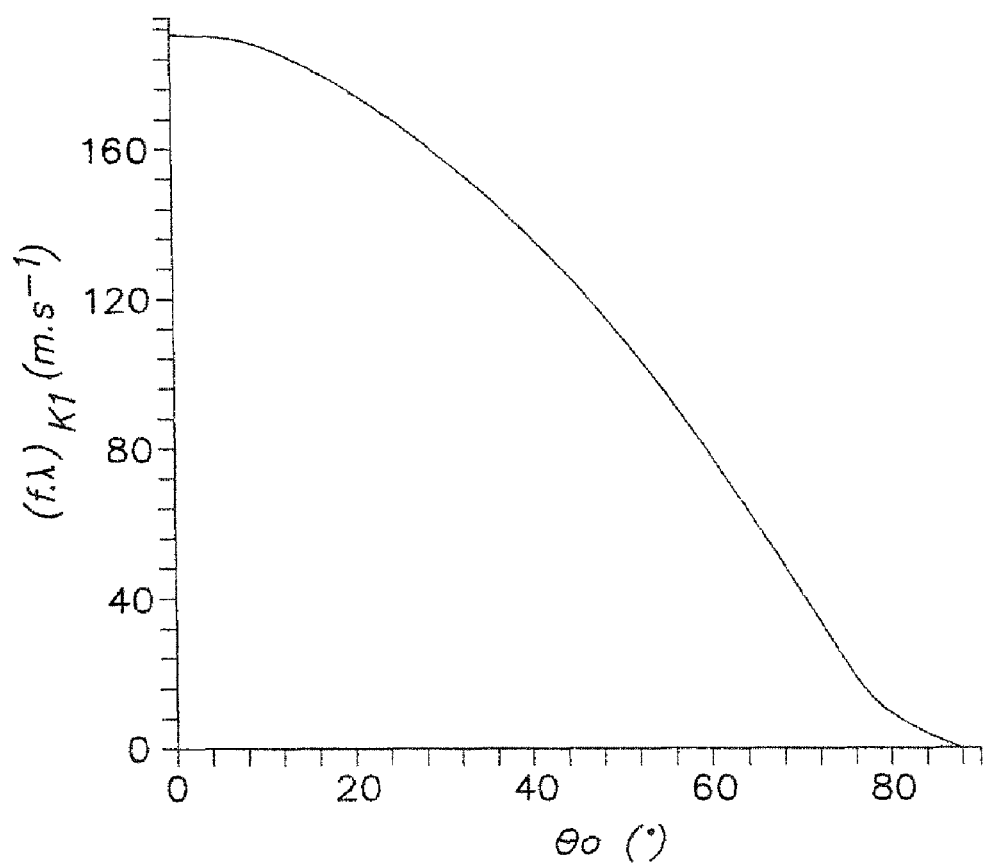
FIG. 2 depicts the variation of the product (ƒλ) as a function of $\theta_0$ in the case of the so-called "low frequency" solution, ƒ being the frequency of the acoustic wave.

In the example depicted in FIG. 2, what is shown is the variation of the product ($f\lambda$) as a function of $\theta_0$ in the case of the so-called "low frequency" solution. According to FIG. 2, for the smaller of the vectors K, the maximum diffraction efficiency ($\theta_0=52°$) appears when the product ($f\lambda$) equals 103.22 m/s, which corresponds to acoustic frequencies lying between 5 and 20 MHz for optical wavelengths lying between 5 and 20 μm.

Figure 3:
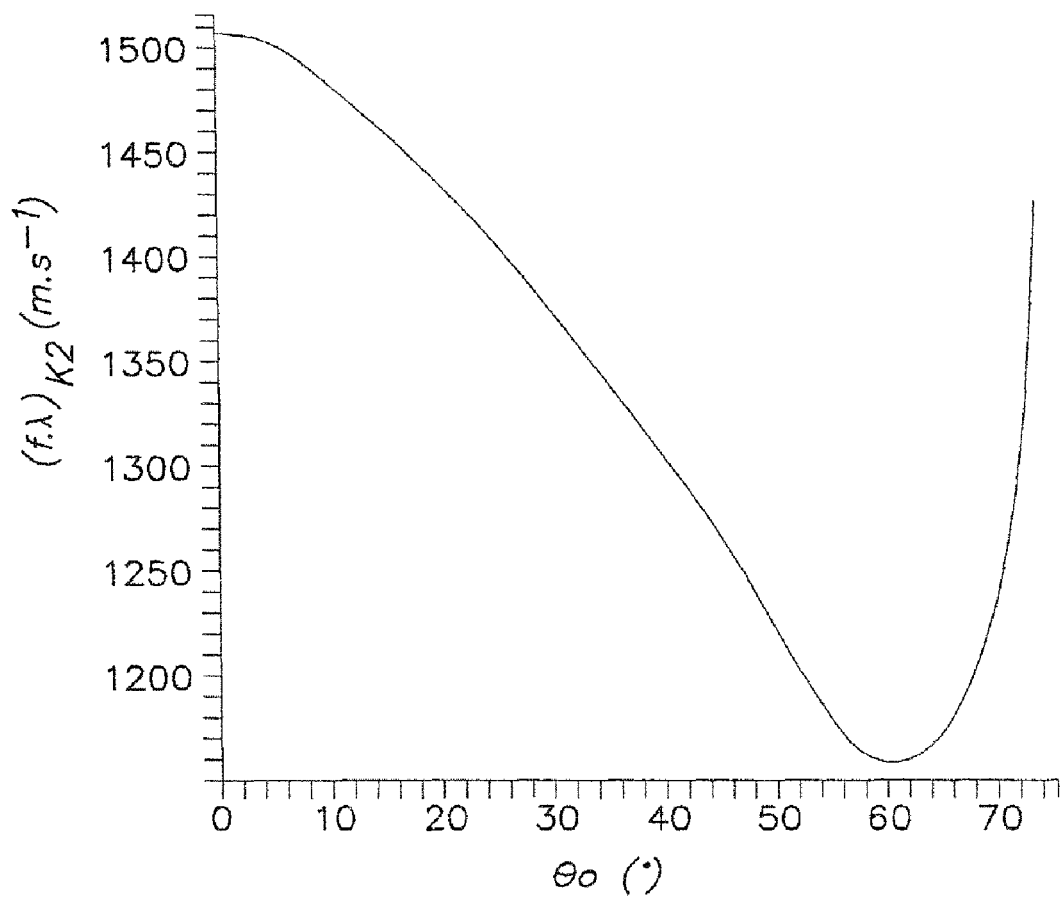
FIG. 3 depicts the variation of the product (ƒλ) as a function of $\theta_0$ in the case of the so-called "high frequency" solution.

In the example depicted in FIG. 3, what is shown is the variation of the product ($f\lambda$) as a function of $\theta_0$ in the case of the so-called "high frequency" solution. According to FIG. 3, for the larger of the vectors K, the maximum diffraction efficiency ($\theta_0=52°$) appears when the product ($f\lambda$) equals 1192.65 m/s, which corresponds to acoustic frequencies lying between 60 and 240 MHz for optical wavelengths lying between 5 and 20 μm.

Moreover, in FIG. 3, the product ($f\lambda$) passes through a minimum close to 1157.27 m/s for $\theta_0=60.6°$, a value for which the figure of merit $M_2$ decreases by only 6%.

Furthermore, the angle $\theta_d$ made by the diffracted extraordinary optical wave vector with the axis [110] is given by:

$$\tan\theta_d = [k_0\sin\theta_0 + K\sin\theta_a]/[k_0\cos\theta_0 + K\cos\theta_a] \quad \text{(equation 8)}$$

Figure 4:
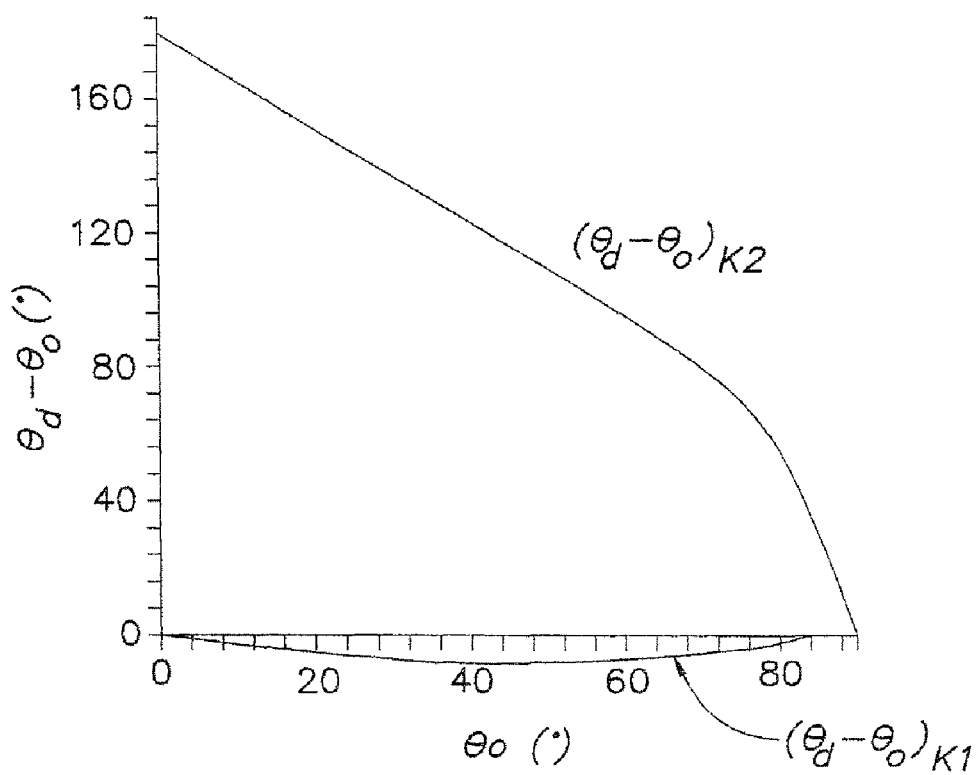
FIG. 4 depicts the angular deviations ($\theta_d$–$\theta_0$) as a function of $\theta_0$ respectively in the case of the so-called "low frequency" solution ($K_1$ vector) and in the case of the so-called "high frequency" solution ($K_2$ vector)

In the example depicted in FIG. 4, the angular deviations ($\theta_d-\theta_0$) as a function of $\theta_0$ are given respectively in the case of the so-called "low frequency" solution (lower dial) and in the case of the so-called "high frequency" solution (upper dial), when the energy alignment condition (equation 2) is applied.

Moreover, the curve relating to the so-called "high frequency" solution shows that the angular deviation ($\theta_d-\theta_0$) is equal to 90° when $\theta_0=60.46°$, which is a value very close to the value $\theta_0=60.6°$, which corresponds to the minimum of the product ($\theta\lambda$).

Figure 5:
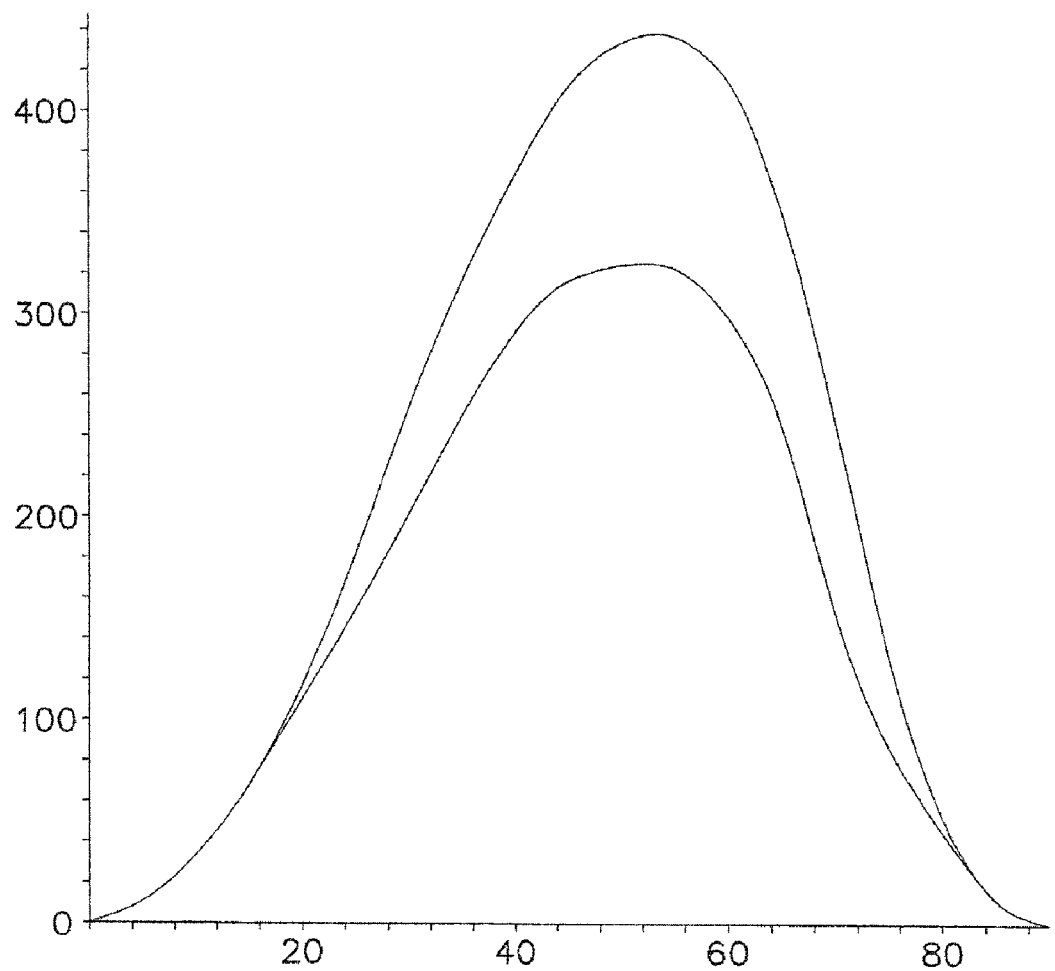
FIG. 5 depicts the variation of the figure of merit $M_2$ as a function of $\theta_0$ for optical wavelengths lying between 5 and 20 µm, for the so-called "low frequency" and "high frequency" solutions.

In the example depicted in FIG. 5, the variation of the figure of merit $M_2$ as a function of $\theta_0$ for optical wavelengths lying between 5 and 20 μm reaches a maximum of 300 mm²/GW for the so-called "low frequency" solution and 440 mm²/GW for the so-called "high frequency" solution, for $\theta_0=52°$, ($\theta_a=7.47°$) and $p_{44}=0$.

Advantageously, this solution of 90° deviation of the diffracted extraordinary optical beam allows the construction of a very high-resolution acousto-optic filter in the infrared region.

Figure 6:
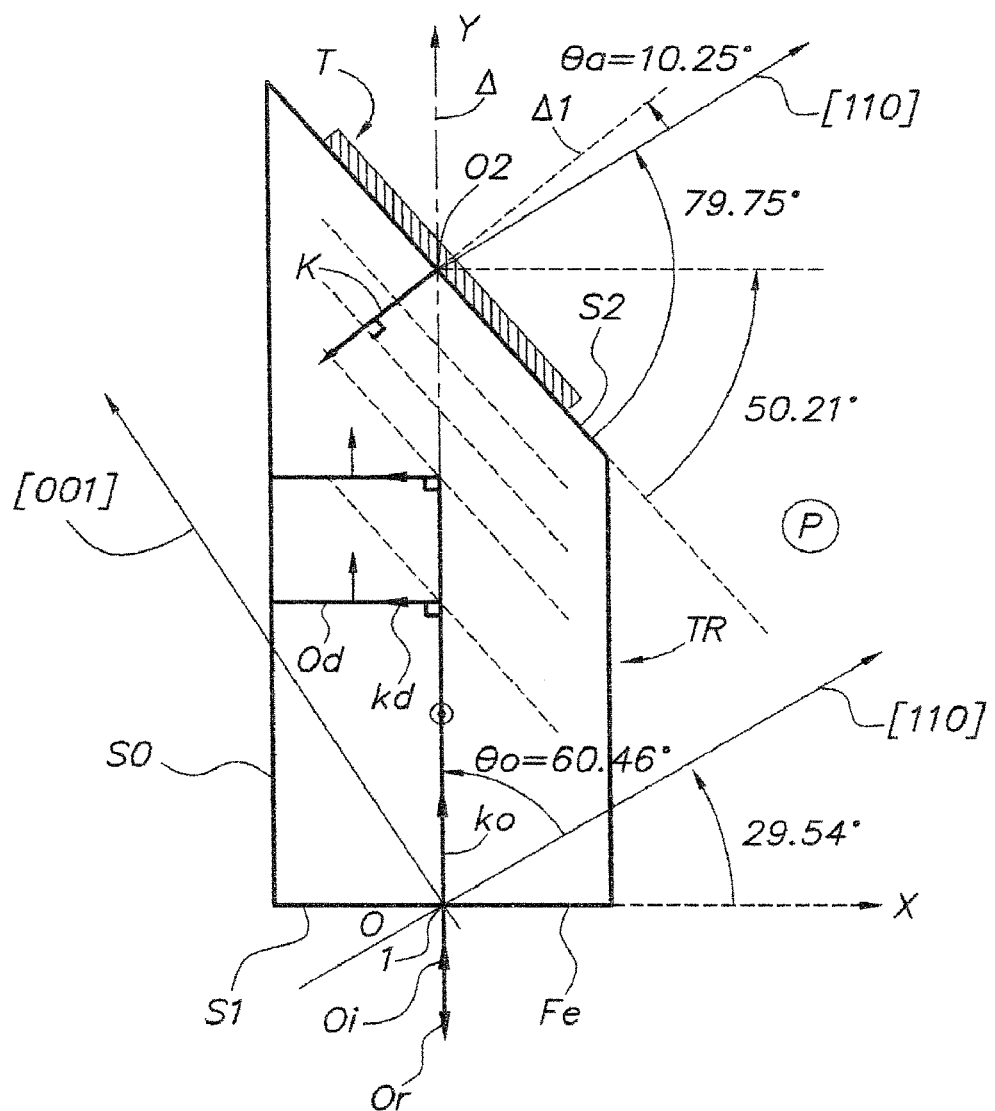
FIG. 6 is a schematic depiction of a proposed Acousto-Optic Programmable Filter structure for the infrared region.

In the example depicted in FIG. 6, an Acousto-Optic Programmable Filter structure for the infrared region involves an acousto-optic crystal depicted schematically by a rectangular trapezium TR, situated in a plane P. The rectangular trapezium includes a base $S_0$, a small side $S_1$ perpendicular to the base $S_0$, and a small oblique side $S_2$ which is oblique to the base $S_0$. The small side $S_1$ has an input face Fe on which there is applied at a point $O_1$, perpendicularly to said input face Fe, an incident optical beam $O_i$, polarised perpendicularly to the plane P containing said rectangular trapezium TR; the incident optical beam $O_i$ and the corresponding wave vector $k_o$ are collinear with an axis $\Delta$, passing through the point $O_1$ and consequently parallel to the base $S_0$ of said rectangular trapezium TR; said axis $\Delta$ crosses the small oblique side $S_2$ at the point $O_2$.

A transducer T, situated on the small oblique side $S_2$ to the base of said rectangular trapezium TR, generates a transverse acoustic beam, whereof the vibrations are perpendicular to the plane P. The corresponding wave vector K is consequently perpendicular to the aforesaid small oblique side $S_2$ of the rectangular trapezium TR.

The plane P, being orthonormal respectively according to X and Y, the axis Y containing the aforesaid axis $\Delta$.

The orientation of the acousto-optic crystal is defined by its two axes [110] and [001]; in schematic depiction terms, the aforesaid axes [110] and [001] pass through the aforesaid point $O_1$.

Thus, in view of the elements defined previously, the axis Y makes an angle $\theta_0$ of 60.46° with the axis [110], and the straight line $\Delta_1$ normal to the aforesaid small oblique side $S_2$, passing through the point $O_2$, makes an angle $\theta_a$ of 10.25° with the axis [110]; the axis [001], passing through the point $O_1$, is of course perpendicular to the axis [110].

In other words, the incident ordinary optical wave vector $k_o$ makes an angle $\theta_0$ of 60.46° with the axis [110], and the acoustic wave vector K makes an angle $\theta_a$ of 10.25° with the same axis [110].

Under these conditions, the acoustic energy of the generated transverse wave propagates in the crystal, in the same direction as the energy of the incident optical wave, but in the opposite sense, according to the aforesaid axis $\Delta$.

Thus, for an angle $\theta_0$ of 60.46° and an angle $\theta_a$ of 10.25°, the face of the transducer, which is adhered to the small oblique side $S_2$, is therefore inclined by −79.75° with respect to the axis [110] and the input face Fe of the incident optical wave is therefore inclined by −29.54° with respect to the axis [110].

The incident optical beam $O_i$ will be diffracted according to an extraordinary optical beam $O_d$ whereof the corresponding wave vector $k_d$ makes an angle close to 90° with the aforesaid wave vector $k_o$; said extraordinary optical beam $O_d$ will then be reflected by a reflective surface SR situated on the base of the rectangular trapezium TR, perpendicular to the plane P; thus the extraordinary optical beam $O_d$ returns on itself and is re-diffracted according to a return ordinary optical beam $O_r$ in a direction coincident with or close to said axis $\Delta$, that is to say in a direction coincident with or close to the direction of said incident optical beam $O_i$.

Thus the aforesaid return ordinary optical beam carries the filtering information resulting from the acousto-optic interaction performed in the birefringent crystal.

The spectral resolution of the filter is such that $\delta\lambda/\lambda = \delta f/f$, wherein $\delta\lambda$ and $\delta f$ represent variations of wavelength and frequency, respectively. The resolution in terms of acoustic frequency $\delta f$ depends on the duration T of the interaction time acoustic window in the crystal. For a crystal of length L:

T=L $\cos(\theta_0-\theta_a)/V(\theta_a)$ and under the conditions of 90° reflection:

$\theta_o=60.46°$, $\theta_a=10.25°$ and $V(\theta_a)=392.2$ m/s and therefore T=16.3 μm/s.

For a rectangular time window, the spectral resolution function after the first diffraction and around a frequency $f_0$ is given by:

$$\sin\{\pi.(f-f_0)T/[\pi(f-f_0)T]\} \quad \text{(equation 9)}$$

At the time of the inverse return of the light, the spectral resolution function is applied a second time, so that the overall spectral resolution function of the filter is written:

$$\sin^2\{\pi(f-f_0)T/[\pi(f-f_0)T]^2\} \quad \text{(equation 10)}$$

This function has a width at mid-height close to $\delta f=0.88/T$.
The spectral resolution in terms of wavelengths of the filter becomes:

$$\delta\lambda/\lambda=0.88/fT=0.88/N, \text{ wherein}$$

N is the number of acoustic wavelengths contained in the length L of the crystal, that is, taking into account the value of the product $(f\lambda)$ and the value of $V(\theta_a)$:

$$\delta\lambda/\lambda^2=4.66\times10^{-5}/L,$$

L being expressed in (cm) and $\delta\lambda/\lambda^2$ in $(\mu m)^{-1}$. As an example, for a crystal length of 2.5 cm and a wavelength of 5 µm, the resolution $\delta\lambda$ is equal to 0.47 nm, that is a relative resolution of the order of 1/10000.

What is claimed is:

1. A device for spectral high-resolution acousto-optic programmable filtering in the infrared region of an incident optical wave comprising:
   a birefringent acousto-optic crystal, from the tetragonal crystal class, having a slow acoustic wave propagation velocity along the [110] axis,
   a piezoelectric transducer disposed on a surface of the birefringent acousto-optic crystal,
   means for inputting an incident ordinary optical wave into said birefringent acousto-optic crystal, in a plan of said crystal containing the axis [001] and [110],
   means for generating in the birefringent acousto-optic crystal a transverse acoustic wave with wave vector, in said plan of said crystal containing the axis [001] and [110], through said piezoelectric transducer, disposed so that:
      the energy of the transverse acoustic wave propagates along a same axis but in an opposite direction to the energy of said incident optical wave, and
      an extraordinary optical wave, resulting from the acousto-optic interaction between said incident optical wave and said transverse acoustic wave, which is diffracted with wave vector, substantially perpendicularly to the direction of said incident optical wave.

2. The device according to claim 1, wherein the acousto-optic crystal is made of calomel, and designed so that the direction of said incident optical wave and of the energy of the said acoustic wave with wave vector make an angle close to 60° with the axis of said acousto-optic crystal.

3. The device according to claim 1, wherein the birefringent acousto-optic crystal comprises a compound of mercury.

4. The device according to claim 1, further comprising a reflective surface disposed so that said diffracted optical wave is re-diffracted substantially collinearly with the direction of said incident optical wave after reflection on said reflective surface.

5. The device according to claim 4, wherein the reflective surface is a mirror fixed to the birefringent acousto-optic crystal.

6. The device according to claim 5, wherein said piezoelectric transducer configured to generate a transverse acoustic wave is a transducer placed on a face of the birefringent acousto-optic crystal opposite to an input face of the aforesaid incident optical wave.

7. The device according to claim 6, wherein the normal direction to the plane of the piezoelectric transducer makes an angle close to 10° with respect to the axis of the acousto-optic crystal.

* * * * *